Figure 1:
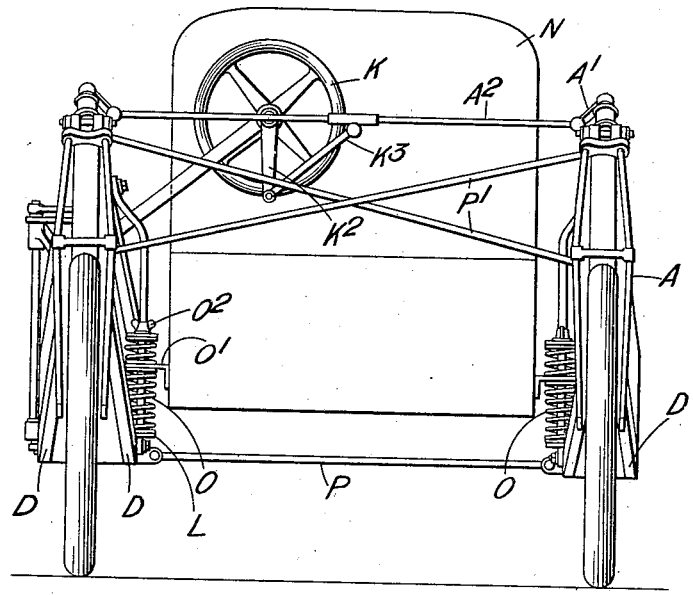

A. G. NEW, DEC'D.
G. NEW, EXECUTOR.
MOTOR ROAD VEHICLE.
APPLICATION FILED OCT. 1, 1912.

1,086,340.

Patented Feb. 3, 1914.
3 SHEETS—SHEET 1.

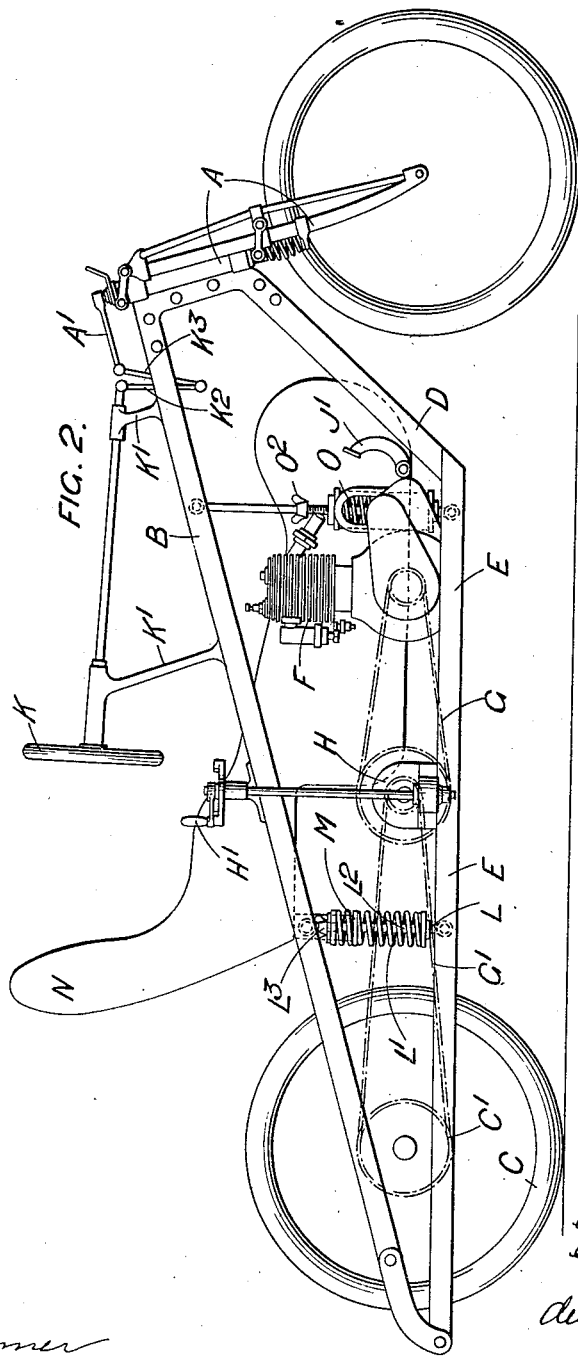

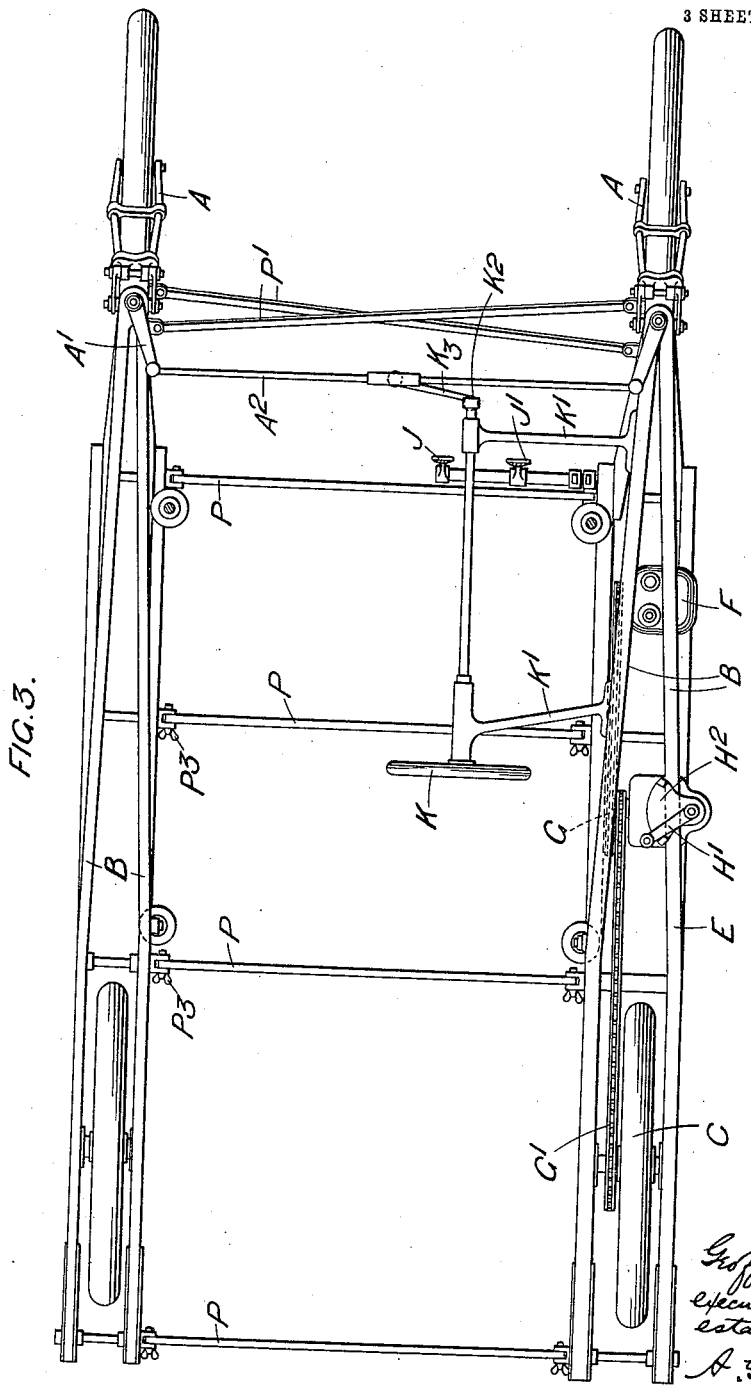

UNITED STATES PATENT OFFICE.

ANTHONY GEORGE NEW, DECEASED, LATE OF PURLEY, ENGLAND, BY GEOFFREY NEW, EXECUTOR, OF EVESHAM, ENGLAND.

MOTOR ROAD-VEHICLE.

1,086,340.  Specification of Letters Patent.  Patented Feb. 3, 1914.

Application filed October 1, 1912. Serial No. 723,409.

*To all whom it may concern:*

Be it known that ANTHONY GEORGE NEW, deceased, formerly a subject of the King of England, and late resident of Purley, Surrey, England, invented certain new and useful Improvements in Motor Road-Vehicles, of which the following is a specification.

This invention relates to motor road vehicles and particularly to light cars and has for its object to provide a car of this description which is capable of occupying but little space when occasion demands, and can be at the same time cheaply constructed.

According to this invention the vehicle comprises two side frames, one or both of which carries the driving elements of a motor bicycle, the side frames being connected by light cross ties which maintain the frames in horizontal alinement, and a passenger car or body being disposed between the frames and supported thereby independently of the cross ties.

In its simplest form the ends of the cross ties are rigidly connected to the frame, for instance by being screw-threaded, the flexibility or springiness of the material from which the rods are formed permitting the necessary play to take place between the two side frames and at the same time restraining undue relative movement.

In its preferred form the cross ties are adapted to hinge about horizontal pivots which may be removable, near each end thereof and the passenger car is removably connected to the side frames. The car in this arrangement maintains the lateral stability of the vehicle, and when removed, enables the vehicle to be collapsed by one side frame being raised or lowered bodily, thus reducing the total width for the purpose of passing narrow gateways the pivoted tie rods maintaining the frames parallel to one another. It will thus be seen that a vehicle is provided in which the weight of the passenger car and the load it carries is taken up solely by the side frames without any weight-bearing cross bars or axles being necessary, at the same time provision being made whereby the two frames can be folded so as to occupy but little width for storage or passing through narrow places.

In the accompanying drawings which show by way of example one form of light motor road vehicle constructed in accordance with this invention, Figure 1 is a front elevation, Fig. 2 is a side elevation, and Fig. 3 is a plan.

The construction illustrated comprises two side frames formed of wood. The front wheels of the vehicle on each side are carried by the front forks and supporting head A of an ordinary motor bicycle, spring forks being shown by way of example. The upper member of each side frame comprises two spaced parallel wooden members B which extend from the steering head to a point in rear of the axle of each back wheel C. From the crown of each fork A two spaced wooden frame members D extend in a downward direction to join the forward ends of two spaced stays E which connect the lower ends of the members D and the rear ends of the upper frame members B, the stays E being arranged approximately parallel with the ground. By spacing the members B, D, E which constitute the frame at the required distance from one another as shown in Figs. 2 and 3 the rear wheels C can each be mounted between the members which constitute each frame in suitable bearings carried thereby so that the members B of each frame serve as the rear forks.

In the construction illustrated the right hand frame carries the driving elements of a motor bicycle, the engine F which may be of any known type being mounted between the back stays E near their forward ends and driving chains G G' connecting the engine with a sprocket wheel C' mounted on the rear wheel in the usual manner. The variable speed gear employed may be of any convenient type but is shown as inclosed in a gear box H and actuated by a lever H' working over a quadrant $H^2$. Pedals J and J' mounted on a bracket so as to extend to the space within the two side frames serve to actuate the engine clutch and rear brake through suitable mechanism, omitted for the sake of greater clearness. The upper ends of the steering heads are provided with levers A' which are coupled by a link $A^2$ and a steering wheel K mounted on brackets K' secured to the right hand frame has a crank $K^2$ formed at its forward end which is pivotally connected by a link $K^3$ to the rod $A^2$. Thus the front wheels A turn in the same direction as the steering wheel K, though some other suitable mechanism may be substituted. The steering pillar is preferably readily detachable from the link K² and the connecting rod A² is also preferably capable of being readily disconnected from the levers A' or the ends of the connecting rods A² are connected to the levers A' by horizontal pivots arranged in a direction parallel to the length of the car.

The left hand frame is similar in all respects to that already described but in the present instance it is not provided with the driving elements of a motor bicycle. Alternatively if desired the two side frames may be identical and each provided with an independent driving motor.

Mounted on the inner horizontal stay member E of each frame is a bracket L supporting a coiled spring L', the upper end of a rod L² which extends vertically through the spring being screw threaded and adapted to be passed through a lug or eye M formed near each rear corner of the passenger car or body N which is conveniently made to carry two persons. The forward ends of the passenger car have laterally extending pins or trunnions which engage suitable brackets mounted on the inner members D or springs O mounted on vertical members extending from the rear stays E may engage lugs O' connected to the front of the car having slotted ends winged nuts O² or the like serving to keep the car in place. In the case of the rear springs a winged nut L³ may be provided to engage the screw threaded ends of the rods L² and thus retain the lugs M in contact with the upper surfaces of the coil springs L'. It will thus be seen that the car body N is supported solely by the side members of the frame the floor or base of the car being slotted or recessed to enable the clutch and brake-operating pedals J, J' to extend therethrough.

The side frames are connected together by a suitable number of light cross rods P the ends of which are provided with horizontal pivots arranged in a direction parallel to the length of the car. Conveniently the two tie rods P' connecting the heads of the frames are crossed, so that each tie P' connects a fork crown with the opposite steering head. The pivots may be removable—winged nuts P³ being shown by way of example. The cross ties P are so disposed with relation to the car body N that when the latter has been removed and the steering gear has been disconnected in some convenient manner, it is possible to collapse the vehicle so that one of the side frames occupies a position higher or lower relatively to the other, the horizontal pivots enabling the two frames to be folded together in this manner. The bracket supporting the brake and clutch-actuating pedals will be cleared by the other frame being raised above or lowered below its level. Alternatively the winged nuts P³ are removed thus enabling the pivots to be withdrawn and one frame bodily detached.

It will be appreciated that in many respects the car above described may be modified to suit particular requirements and an epicyclic type of change speed gear formed within the rear hub may be employed if desired the side frames and other parts of the vehicle being correspondingly altered. The fuel tank is conveniently carried, as in the case of a motor bicycle, within the right hand frame, so that communication between the fuel tank and the engine is not disturbed when the passenger car is removed. In the same way where a water-cooled engine is employed, the radiator and water tank may be provided on one of the side frames and independent of the passenger car.

The actual method of supporting the passenger car may vary with the shape of the latter, but in all instances the weight of the car is carried solely by the side frames independently of the connecting cross-ties, the form of spring being designed to suit the dimensions of the car and frame.

What I claim as my invention and desire to secure by Letters Patent is:—

1. In a motor road vehicle the combination of two side frames, driving means supported by one of said frames, cross-ties connecting the frames together and a passenger car arranged between the frames and supported thereby independently of the cross-ties.

2. In a motor road vehicle the combination of two side frames, driving means supported by one of said frames cross-ties connecting the frames together, and a passenger car removably arranged between the frames and supported thereby independently of the cross-ties.

3. In a motor road vehicle the combination with two side frames, driving means carried by one of said frames, light cross-ties connecting the frames together, a passenger car supported solely by the side frames and removably connected thereto and pivot joints between the cross-ties and side frames enabling the latter to be moved relatively to each other when the car is removed.

4. In a motor road vehicle the combination with two side frames, driving means carried by one of said frames, light cross-ties connecting the frames together, a passenger car supported solely by the side frames and removably connected thereto and removable pivots connecting the cross-ties and side frames.

5. In a motor road vehicle the combination of two side frames, driving means supported by one of said frames, a passenger car supported solely by the side frames and removably connected thereto, light cross ties connecting the side frames together and horizontal pivot joints between the ends of the cross-ties and side frames enabling one side frame to be moved above and nearer to the other side frame when the car is removed.

6. In a motor road vehicle the combination of two bicycle frames, driving means supported by one of said frames a passenger car supported solely by the bicycle frames and removable therefrom and cross-ties connecting the frames together.

7. In a motor road vehicle, the combination of two bicycle frames each comprising spaced members, driving means suported by one of said frames a passenger car supported solely by the side frames and removable therefrom and cross-ties connecting the bicycle frames together.

8. In a motor road vehicle the combination of two bicycle frames each comprising spaced members, driving means supported by one of said frames a passenger car supported solely by the side frames and removable therefrom, cross-ties connecting the bicycle frames together and removable pivots connecting the cross-ties to the frames.

9. In a motor road vehicle the combination of two bicycle frames, driving means supported by one of said frames, light cross-ties connecting the frames together, a passenger car supported solely by the bicycle frames and removably connected thereto and pivot joints between the cross-ties and bicycle frames enabling the latter to be moved relatively to each other when the car is removed.

10. In a motor road vehicle the combination of a bicycle frame, a motor cycle engine and driving elements supported thereby, a second bicycle frame, light cross-ties connecting said frames together and a passenger car removably mounted on the frames and supported solely thereby independently of the cross-ties.

11. In a motor road vehicle the combination of a bicycle frame, a motor cycle engine and driving elements supported thereby, a second bicycle frame, light cross-ties connecting said frames together, a passenger car removably mounted on the frames and supported solely thereby independently of the cross-ties and removable pivots connecting the cross-ties to the bicycle frames.

12. In a motor road vehicle the combination of two bicycle frames, driving means supported by one of said frames, a passenger car supported solely by the said frames and removably connected thereto, light cross ties connecting the frames together and horizontal pivot joints between the ends of the cross ties and frames enabling one bicycle frame to be moved above and nearer to the other bicycle frame when the car is removed.

13. In a motor road vehicle the combination of a bicycle frame, a motor cycle engine and driving elements supported thereby, a second bicycle frame, each frame comprising spaced members, light cross-ties connecting said frames together and a passenger car removably mounted on the frames and supported solely thereby independently of the cross-ties.

14. In a motor road vehicle the combination of a bicycle frame, a motor cycle engine and driving elements supported thereby, a second bicycle frame, a passenger car supported solely by said frames and removably connected thereto, light cross ties connecting the frames together and horizontal pivot joints between the ends of the cross-ties and bicycle frames enabling one frame to be moved above and nearer to the other frame when the car is removed.

15. In a motor road vehicle, the combination of side frames, supporting wheels, driving means, connections between the frames, and a body supported by the frames independently of said connections.

In testimony whereof I have signed my name to this specification in the presence of two subscribing witnesses.

GEOFFREY NEW,
*Executor of the estate of Anthony George New, deceased.*

Witnesses:
    MAURICE INJHEVILLE,
    THOMAS J. SUCH.

---

Copies of this patent may be obtained for five cents each, by addressing the "Commissioner of Patents, Washington, D. C."